(12) United States Patent
Carreon et al.

(10) Patent No.: US 8,685,143 B2
(45) Date of Patent: Apr. 1, 2014

(54) METHOD OF MAKING A HIGH-PERFORMANCE SUPPORTED GAS SEPARATION MOLECULAR SIEVE MEMBRANE USING A SHORTENED CRYSTALLIZATION TIME

(75) Inventors: Moises Abraham Carreon, Louisville, KY (US); Zaida Diaz, Katy, TX (US); John Lucien Falconer, Boulder, TX (US); Hans Heinrich Funke, Boulder, CO (US); Shiguang Li, Mount Prospect, IL (US); Brendan Dermot Murray, Houston, TX (US); Richard Daniel Noble, Boulder, CO (US); Paul Jason Williams, Richmond, TX (US)

(73) Assignees: Shell Oil Company, Houston, TX (US); The Regents of the University of Colorado, a Body Corporate, Denver, CO (US)

( * ) Notice: Subject to any disclaimer, the term of this patent is extended or adjusted under 35 U.S.C. 154(b) by 412 days.

(21) Appl. No.: 12/936,795

(22) PCT Filed: May 15, 2009

(86) PCT No.: PCT/US2009/044063
§ 371 (c)(1),
(2), (4) Date: Feb. 8, 2011

(87) PCT Pub. No.: WO2009/140565
PCT Pub. Date: Nov. 19, 2009

(65) Prior Publication Data
US 2011/0113958 A1      May 19, 2011

Related U.S. Application Data

(60) Provisional application No. 61/053,460, filed on May 15, 2008, provisional application No. 61/095,814, filed on Sep. 10, 2008.

(51) Int. Cl.
*B01D 53/22* (2006.01)
*B01D 67/00* (2006.01)

(52) U.S. Cl.
USPC ............... 95/45; 95/51; 96/4; 96/10; 96/11; 427/245; 502/4; 502/60; 423/702

(58) Field of Classification Search
USPC .......... 95/45, 51; 96/4, 10, 11; 427/245, 246, 427/372.2, 430.1, 435, 443.2, 244; 502/4, 502/60, 64, 69; 423/702, 709
See application file for complete search history.

(56) References Cited

U.S. PATENT DOCUMENTS

| 5,723,397 A | 3/1998 | Verdujin |
| 6,177,373 B1 | 1/2001 | Sterte et al. |

(Continued)

FOREIGN PATENT DOCUMENTS

RU      2183499      6/2002

OTHER PUBLICATIONS

Shell Oil Company, PCT International Search Report dated Jul. 13, 2009 for PCT/US2009/044063.

(Continued)

*Primary Examiner* — Jason M Greene
(74) *Attorney, Agent, or Firm* — Blakely Sokoloff Taylor & Zafman LLP

(57) ABSTRACT

A method of making a supported gas separation molecular sieve membrane. In this method a porous support, which is preferably pretreated, is contacted with a molecular sieve synthesis mixture under hydrothermal synthesis conditions. The contacting step is conducted for a shortened crystallization time period. The resulting coated porous support is calcined to yield the supported gas separation molecular sieve membrane having particularly good gas separation characteristics.

24 Claims, 2 Drawing Sheets

(56) References Cited

U.S. PATENT DOCUMENTS

| | | | |
|---|---|---|---|
| 6,193,784 B1* | 2/2001 | Yazawa et al. | 96/11 |
| 6,472,016 B1* | 10/2002 | Soria et al. | 96/11 |
| 7,316,727 B2 | 1/2008 | Falconer et al. | |
| 2005/0204916 A1* | 9/2005 | Falconer et al. | 95/51 |
| 2006/0079725 A1* | 4/2006 | Li et al. | 502/4 |
| 2006/0144239 A1 | 7/2006 | Suzuki et al. | |
| 2007/0265484 A1 | 11/2007 | Li et al. | |
| 2008/0047432 A1 | 2/2008 | Nonaka et al. | |
| 2010/0116130 A1 | 5/2010 | Carreon et al. | |

OTHER PUBLICATIONS

Li, et al., "High Pressure $CO_2/CH_4$ Separation Using SAPO-34 Membranes", Ind. Eng. Chem. Res. vol. 44, No. 9 (2005), 3220-3228.

Li, S, et al., "SAPO-34 Membranes for $CO_2/CH_4$ Separation", Journal of Membrane Science, vol. 241, No. 1 (Sep. 15, 2004), pp. 121-135.

Regents, University of Colorado, EPO Supplementary European Search Resort mailed Apr. 14, 2010; Application No. EP 07762043.3 (Apr. 14, 2010), 2 pages.

Regents, University of Colorado, Chinese Examination Report mailed Apr. 6, 2010 for Chinese Application No. GCC/P/2007/8318 (Apr. 6, 2010), 9 pages.

Regents, University of Colorado, PCT Search Report and Written Opinion, mailed May 8, 2008 for PCT Application No. PCT/US07/68542 (May 8, 2008), 16 pages.

Regents, University of Colorado, Australian Search Report, mailed Jun. 1, 2010 for Singapore Application No. SG200808108-5 (Nov. 25, 2009), 8 pages.

Regents, University of Colorado, Australian Examiner's Report mailed Jul. 30, 2010 for Australian Application No. 2007249452 (Jul. 30, 2010), 3 pages.

Regents, University of Colorado, Examination Report mailed Jun. 10, 2010 for New Zealand Application No. 572347 (Jun. 10, 2010), 2 Pages.

Regents, University of Colorado, Vietnamese Written Opinion mailed Feb. 28, 2011 for Vietnamese Application No. 1-2008-03047 (Feb. 28, 2011), 1 page.

Regents, University of Colorado, Chinese Search Report mailed Apr. 22, 2010 for Chinese Application No. GCC/P/2007/8318 (Apr. 22, 2010).

Regents, University of Colorado, EA Notification on Necessity to Provide Additional Materials mailed Feb. 1, 2011 for Application No. EA200802326 (Feb. 1, 2011), 2 pages.

* cited by examiner

METHOD OF MAKING A HIGH-PERFORMANCE SUPPORTED GAS SEPARATION MOLECULAR SIEVE MEMBRANE USING A SHORTENED CRYSTALLIZATION TIME

CROSS-REFERENCE TO RELATED APPLICATIONS

This patent application is a U.S. National Phase application under 35 U.S.C. §371 of International Application No. PCT/US2009/044063, filed on May 15, 2009, entitled METHOD OF MAKING A HIGH-PERFORMANCE SUPPORTED GAS SEPARATION MOLECULAR SIEVE MEMBRANE USING A SHORTENED CRYSTALLIZATION TIME, which claims priorities to U.S. Patent Application No. 61/053,460, filed May 15, 2008 and U.S. Patent Application No. 61/095,814, filed Sep. 10, 2008.

FIELD

This application relates to a method of making a high-performance supported molecular sieve membrane.

BACKGROUND

It is known in the art that molecular sieve materials may be deposited on porous supports to form thin-layered membranes that have characteristics making them useful in the separation of gaseous mixtures. A number of publications report various methods of manufacturing such thin-layered membranes. For instance, U.S. Pat. No. 5,723,397 discloses a method of depositing from a synthesis solution a molecular sieve layer upon a support. The synthesis mixture of this method comprises a silica source and an organic structure directing agent and may be suitable for forming molecular sieves such as aluminosilicate, aluminophosphate, silicoaluminophosphate, metalloaluminophosphate or metalloaluminohosphosilicate. The support is immersed into the synthesis mixture, and a layer of crystallized molecular sieve particles is formed on the support. During this synthesis step, the crystallization temperature is stepwise or continuously increased over a period that may, for example, range from 24 hours to 7 days, and, preferably, this period is in the range of between 3 and 6 days. The membrane may be used to carry out separations of hydrocarbons and alcohol from aqueous streams. There is no indication that the membranes may suitably be used in the selective separation of carbon dioxide from methane or other hydrocarbons. The method also requires the temperature of the synthesis mixture to be increased during the crystallization in a stepwise fashion over the above-noted significantly long time period. There is no teaching of the separation characteristics of the membrane except with respect to the amount of defects found in the membrane layer.

U.S. Pat. No. 6,177,373 discloses a method of preparing a molecular sieve monolayer upon a substrate. In this method, a thin, molecular sieve film is deposited on the surface of a porous substrate by contacting it with a molecular sieve synthesis mixture under hydrotreatment conditions. The heating time may be in the range of from 1 hour to 6 days. The membrane product of the '373 patent may be used in hydrocarbon separations, but there is no mention of the application of the membrane product in the selective separation of carbon dioxide from lower molecular weight hydrocarbon compounds or of it having the capability to selectively separate carbon dioxide from lower molecular weight hydrocarbons, such as methane, ethane and the like. Moreover, there is no suggestion that a supported silicoaluminophosphate (SAPO) membrane may be made from a SAPO synthesis mixture, using a shortened crystallization time, which exhibits high performance carbon dioxide/lower molecular weight hydrocarbon performance characteristics. The required crystallization times for preparing the molecular sieve membranes taught by the '373 patent are significantly long, and, while the '373 patent may suggest that the membranes may be continuous and dense, there is no suggestion that they can have high performance in the selective separation of carbon dioxide from lower molecular weight hydrocarbons.

U.S. Pat. No. 7,316,727 discloses a method of preparing a SAPO membrane by placing a porous support within a crystallization synthesis gel under crystallization synthesis conditions to deposit on the surface thereof one or more layers of SAPO crystals to form a continuous, gas-tight membrane. This patent teaches that long crystallization times in the range of from about 15 to about 25 hours are required for each synthesis step in order to form the continuous, gas-tight membranes, and it further suggests that the formation of several layers of crystals by the application of multiple synthesis steps may be necessary in order to form a continuous layer that is impermeable (before calcination thereof) to nitrogen. There is no indication in the '727 patent that a single, rapid crystallization step may be used to form a thin, gas-tight membrane on the support, nor is there a suggestion that a single-step, rapid crystallization will provide for a membrane that exhibits characteristically high performance in the separation of carbon dioxide from methane relative to membranes made by using longer crystallization times.

There is a need for improved methods to economically manufacture supported molecular sieve membranes that have high-performance gas separation properties.

SUMMARY

It is, thus, an objective of this invention to provide a method of making a gas separation, supported molecular sieve membrane that utilizes an economically beneficial shortened crystallization time.

Another objective of the invention is to provide a gas separation, supported molecular sieve membrane that exhibits particularly good separation characteristics.

Thus, provided is a method of making a supported gas separation molecular sieve membrane, wherein said method comprises: applying molecular sieve crystals to a surface of a porous support to thereby provide a seeded porous support surface; contacting under hydrothermal synthesis conditions said seeded porous support surface with a synthesis gel mixture for a shortened crystallization time in the range of upwardly to about 20 hours so as to provide a coated porous support; and calcining said coated porous support under calcination conditions including a calcination temperature in the range of from 250° C. to 650° C. to thereby provide said supported gas separation molecular sieve membrane that is characterized as having a $CO_2/CH_4$ separation selectivity (as measured using a 50 vol % $CO_2$/50 vol % $CH_4$ gas mixture at a temperature of 22° C. and a pressure driving force of 138 kPa) of at least 100.

DETAILED DESCRIPTION

Figure 1:
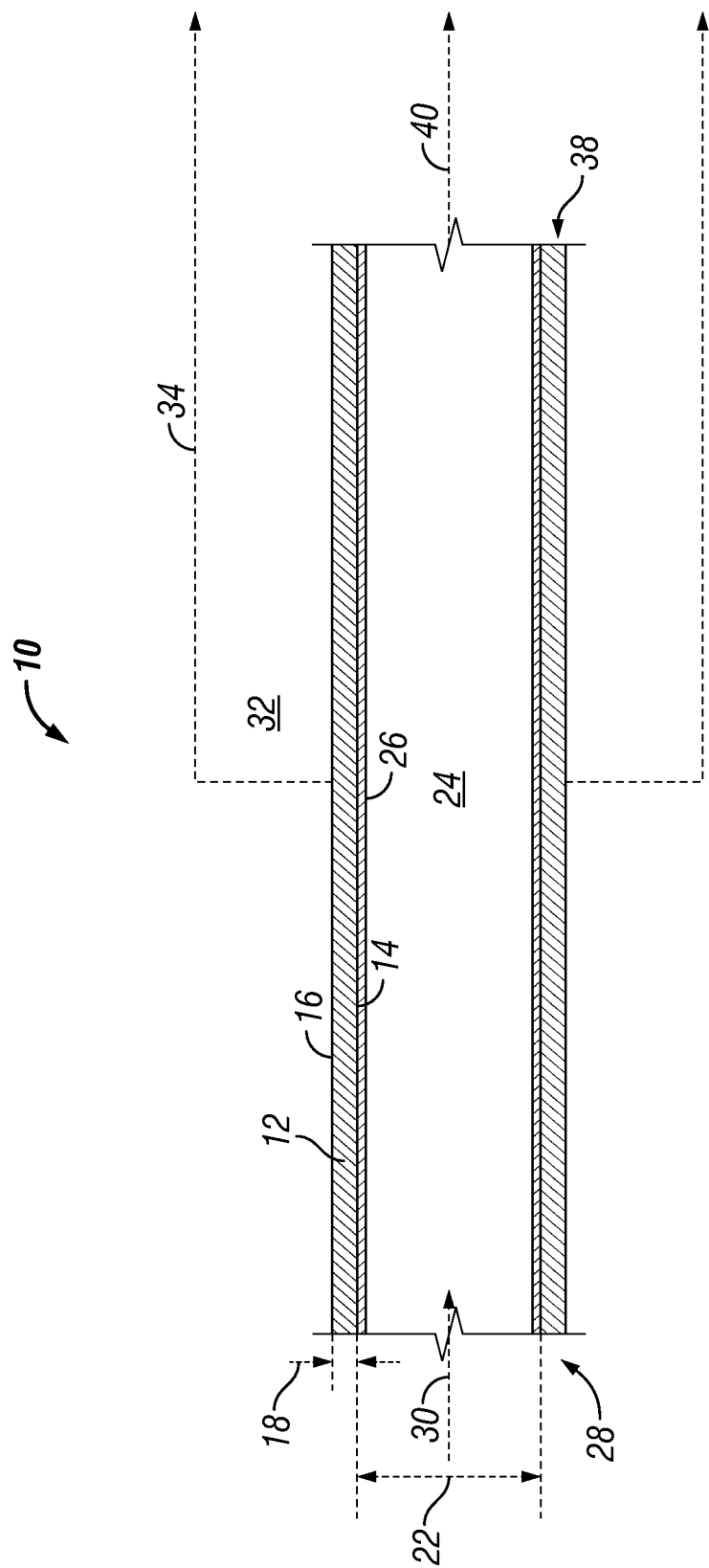
FIG. 1 depicts a cross-section of a gas separation membrane system of the invention used in a process for the selective separation of a gas component from a gas mixture.

The inventive method or process provides for a more economical way of manufacturing a supported molecular sieve membrane that is suitable for use in the separation of gaseous compounds. This method uses a reduced or shortened crystallization synthesis or contacting time period when forming the molecular sieve membrane upon the surface of a porous support by contacting it with a molecular sieve synthesis gel mixture. The method further provides for a supported molecular sieve membrane having high-performance characteristics in the separation of gases, and, in some instances, preferably, having performance characteristics that are enhanced over those of other supported molecular sieve membranes made using more conventional synthesis contacting times.

One advantage of the inventive method is that it provides for the rapid formation upon the surface of a porous substrate of a thin layer of molecular sieve crystals that is dense and substantially free of defects. Also, the resulting supported membrane typically will have particularly high performance characteristics when used in the separation of carbon dioxide from low molecular weight, normally gaseous hydrocarbons. This rapid formation of the thin film or layer of molecular sieve crystals shortens the amount of time that is required to make the membrane thereby speeding up the manufacturing process and making it more economical than alternative processes. Moreover, it is one of the unexpected aspects of the inventive method that not only can a thin, defect-free membrane be formed on a porous support by using a single-step, shortened crystallization time, but, a supported membrane also can be made that has enhanced gas separation performance characteristics over those of other supported membranes that are prepared using longer crystallization times.

Another of the advantages of the inventive method is that, due to its use of a shortened crystallization time, the supported molecular sieve membrane is exceptionally thin thereby providing for enhanced gas separation capabilities. This is because, usually, a thinner membrane provides for a higher gas flux. The one problem associated with the preparation of thin membranes, however, is that they are difficult to make without having defects. The thin membrane made by the inventive method is unexpectedly free of significant amounts of defects such as cracks, pinholes and the like, in that the art suggests that the laydown of either multiple layers or thicker layers of molecular sieve crystals is often required in order to form membranes that are gas-tight, i.e., being free of cracks or pinholes that allow for the passage gas therethrough.

The inventive method includes forming a layer of molecular sieve crystals upon the surface of a porous support by contacting it with a synthesis gel mixture. This contacting is done under hydrothermal synthesis conditions that suitably provide for the formation or deposition of a layer of molecular sieve crystals upon the porous support surface.

The porous support may be of any shape or geometry contemplated for use in the manufacture of a supported molecular sieve membrane for use in gas separation applications and that is capable of having formed thereon and supporting a thin, dense and continuous layer of molecular sieve crystals. The porous support further is to be made of or to comprise a porous material that is significantly permeable to gases, and, in particular, the porous material has a porosity such that it provides very little, if any, resistance to the flow therethrough of low molecular weight or normally gaseous hydrocarbons (e.g., $CH_4$, $C_2H_6$, $C_3H_8$, $C_2H_4$, $C_2H_2$, $C_2H_6$, etc.) and inorganic compounds (e.g., $H_2$, $O_2$, $CO_2$, $H_2S$, COS, $CS_2$, $H_2O$, etc.).

Thus, the porous support may be of any suitable shape or geometry, including, such shapes as planar or curvilinear sheets of the porous material having an undersurface and a top surface that together define a sheet thickness, or shapes that can be tubular, such as, for example, circular, square, rectangular, and polygonal tubular shapes that have an inside surface and an outside surface that together define a wall thickness and with the inside surface of the tubular shape defining a tubular conduit.

For those porous supports of the invention that are circular tubes, the internal diameter can be in the range of upwardly to 20 mm, but, more typically, in the range of from 1 mm to 8 mm. For square, rectangular, or polygonal tubular shapes, the maximum internal cross dimension can, also, be in the range of upwardly to 10 mm, but, more typically, in the range of from 1 mm to 8 mm.

The tubular structures can have a lineal length (support length) of from 0.1 meter up to 2 or 3 meters, but, typically, the length of the tubular structure of the invention is in the range of from 0.2 meter to 2 meters. The preferred length of the tubular structure is in the range of from 0.5 m to 1.5 m.

For those porous supports of the invention that are planar or sheet material, they will have at least one dimension other than the thickness dimension, a support height (length), that is in the range of from 0.01 meter up to 2 or 3 meters, but, typically, the length of height is in the range of from 0.2 meter to 2 meters. The preferred height (length) of the planar structure is in the range of from 0.5 m to 1.5 m.

It is desirable for the porous support to have a relatively large surface area-to-volume ratio, and, therefore, preferred structures for use as the porous support of the invention include those that are selected from multichannel supports, monolithic supports, and hollow fiber supports. These structures are preferred over, for example, single tubular structures because of their exceptionally high surface area-to volume ratios relative to single tubular structures.

While the surface area per lineal length of a preferred structure is significantly dependent upon the number and size of the channels of a length of such structure, in general, their surface area per lineal length can be in the range of from 0.075 to 10 $m^2/m$ or even higher depending on the particular structure. For example, for those structures with from 5 to 100 channels having a channel size in the range of from 1 mm to 10 mm in diameter, the surface area per lineal length in many cases can be in the range of from 0.1 to 1 $m^2/m$.

The length of the preferred structure can be in the range of from 0.01 meter up to 2 or 3 meters, but, typically, the length of the preferred structure of the invention is in the range of from 0.2 meter to 2 meters. The preferred length, however, is in the range of from 0.5 m to 1.5 m.

The porous support may be made of or comprise porous material selected from any materials known to those skilled in the art including, but not limited to, inorganic porous materials, including, α-alumina, γ-alumina, glass, titania, zirconia, carbon, silicon carbide, clays or silicate materials, aerogels, supported aerogels, and supported silica, titania, and zirconia; the stainless steels, such as, for example, the 301, 304, 305, 316, 317, and 321 series of stainless steels, the twenty or more HASTELLOY® alloys, for example, HASTELLOY® B-2, C-4, C-22, C-276, G-30, X and others, and the INCONEL® alloys, for example, INCONEL® alloy 600, 625, 690, and 718.

The aforementioned porous metal materials can comprise an alloy that is reasonably permeable to normally gaseous compounds and which comprises chromium, and, preferably, further comprises nickel. The porous metal material may further comprise an additional alloy metal selected from the group consisting of iron, manganese, molybdenum, tungsten, cobalt, copper, titanium, zirconium, aluminum, carbon, and any combination thereof.

One particularly desirable metal alloy suitable for use as the porous metal material can comprise nickel in an amount in the range of upwardly to about 70 weight percent of the total weight of the alloy and chromium in an amount in the range of from 10 to 30 weight percent of the total weight of the alloy. Another suitable alloy for use as the porous metal material comprises nickel in the range of from 30 to 70 weight percent, chromium in the range of from 12 to 35 weight percent, and molybdenum in the range of from 5 to 30 weight percent, with these weight percents being based on the total weight of the alloy.

The thickness (e.g. wall thickness or sheet thickness, both as described above), porosity, and pore size distribution of the pores of the porous support are properties of the porous material selected in order to provide a gas separation membrane system of the invention that has the desired performance characteristics and other desired properties. It can be desirable to use a porous support having a reasonably small thickness so as to provide for a high gas flux through the porous support.

The porosity of the porous material can be in the range of from 0.01 to 0.5. The term porosity, as used herein, is defined as the proportion of non-solid volume to the total volume (i.e. non-solid and solid) of the porous metal substrate material. A more typical porosity is in the range of from 0.05 to 0.3.

The pore size distribution of the pores of the porous material can vary with the median pore diameter typically being in the range of from about 0.001 µm to about 15 µm. More typically, the median pore diameter is in the range of from 0.002 µm to 10 µm, and, most typically, from 0.01 µm to 5 µm.

For certain porous materials it may be advantageous to treat the surface of the porous support prior to laying down the molecular sieve layer thereon by contacting it with the synthesis gel mixture. U.S. Pat. No. 6,177,373 to Sterte et al., which patent is incorporated herein by reference, describes several methods of porous support surface treatment that may suitably be used. It is preferred, however, to treat the porous support surface prior to the crystallization step in the manner as described in U.S. Patent Application Pub. No. US 2007/0265484.

U.S. Pub. No. US 2007/0265484 describes molecular sieve materials that may suitably be used to pretreat the surface of the porous support, methods of making these molecular sieve materials, and methods of pretreatment of a porous support by the application of the molecular sieve materials to the porous support surface. U.S. Pub. No. US 2007/0265484 is incorporated herein by reference.

It is a more preferred feature of the inventive method to treat the surface of the porous support by applying silicoaluminophosphate molecular sieve crystals that are in loose form made from a synthesis solution having the composition as described elsewhere herein with respect to the contacting step for the formation of the coated porous support. Among the silicoaluminophosphates (SAPOs), SAPO-34 is the most preferred.

While the size of the crystals applied to the porous support surface can vary, it is desirable that they be colloidal in size, generally, having an average size in the range of from 2.5 nm to 1000 nm, or having an average size in the range of from 50 nm to 1000 nm, and, more typically, from 100 nm to 1000 nm.

The crystals may be applied to the porous support surface by any suitable method known to those skilled in the art, such as, for example, by the application of a dry crystalline powder or a colloidal suspension to the surface of the porous support. The application of the molecular sieve crystals to the surface of the porous support will provide a seeded porous support surface that is further subjected to a hydrothermal crystallization to laydown a molecular sieve layer on the seeded surface. The hydrothermal crystallization may be conducted by covering the seeded porous support surface with a crystallization solution or synthesis gel mixture that is suitable for the formation of a SAPO molecular sieve under hydrothermal synthesis conditions. The more preferred SAPO molecular sieve is SAPO-34.

U.S. Pat. No. 7,316,727, which is incorporated herein by reference, describes the SAPO-34 structure, the composition of the synthesis mixture, and the hydrothermal synthesis conditions required to yield a SAPO-34 molecular sieve that may suitably be formed on the porous support to thereby provide a membrane layer thereon. The synthesis gel mixture of the inventive method can, in general, comprise an aluminum source, a phosphorus source, a silicon source, a quaternary ammonium templating agent (R), and water in relative amounts such that the composition of the synthesis gel mixture has the following molar ratios:

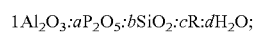

$$1Al_2O_3 : aP_2O_5 : bSiO_2 : cR : dH_2O;$$

wherein:
a is from 0.01 to 52;
b is from 0.03 to 196;
c is from 0.2 to 5; and
d is from 20 to 300.

The hydrothermal synthesis conditions under which the seeded porous support surface is contacted with the synthesis gel mixture include those conditions that suitably provide for the synthesis or crystallization of the molecular sieves of concern and the formation thereof upon the support surface area of the porous support. Typically, the hydrothermal temperature is in the range of from 50 to 300° C., but it is more typical for the hydrothermal temperature to be in the range of from 100° C. to 275° C. It can be desired for the hydrothermal temperature to be maintained in the range of from 125° C. to 275° C., preferably, in the range of from 150° C. to 225° C., and, most preferably, from 175° C. to 220° C.

The hydrothermal synthesis typically is conducted under autogenous pressure, which can be in the range upwardly to 220 bar (3191 psi), and, more typically, in the range of from 1 bar (14.5 psi) to 200 bar (2901 psi) or from 2 bar (29 psi) to 150 bar (2176 psi).

A critical feature of the inventive method is the application of a rapid crystallization contacting step that uses a shortened crystallization time to assure that the resulting formed molecular sieve membrane layer is free of defects and has an especially high carbon dioxide permeance and carbon dioxide/methane ($CO_2/CH_4$) separation selectivity that are improved over such characteristics that are exhibited by membranes formed using longer crystallization times. The use of the shortened crystallization time to provide for a supported molecular sieve membrane having the enhanced performance characteristics is particularly unexpected in that the prior art teaches, or at least suggests, that longer crystallization times are necessary in order to provide defect-free membrane layers that have desirable performance characteristics.

The shortened crystallization time of the crystallization contacting step should be a time period of less than or no more than about 20 hours during which the surface of the porous support is contacted, under hydrothermal synthesis conditions, with a synthesis gel mixture. The contacting is done by any suitable method known to those skilled in the art, such as, by immersion of the porous support into a volume of the synthesis gel mixture. The surface of the porous support is preferably pretreated before contacting it with the synthesis gel mixture, and it is preferred to pretreat the porous support with molecular sieve seed crystals in the manner as described elsewhere herein.

It is not completely clear as to why the use of this shortened crystallization time provides for membranes having enhanced properties, but a number of theories have been advanced. One suggestion is that, as the crystallization time extends into a longer period, types of molecular sieve crystals other than those desired tend to form and deposit on the porous support surface. This formation of undesirable crystals then results in a membrane layer that has less desirable gas separation characteristics.

It is also theorized that features of the porous support surface may influence in some way the morphology of the molecular sieve crystals that are formed on the porous support surface. Thus, as the layer or film of molecular sieves that is formed on the surface of the porous support thickens with the passage of crystallization time, its surface characteristics are obscured, and, thus, they subsequently have less influence upon the morphology of the later formed molecular sieve crystals.

It has been determined that it is particularly desirable for the shortened crystallization time to not exceed or to be less than about 18 hours. It is more desirable, however, for the shortened crystallization time that is used in the crystallization contacting step to be less than about 15 hours, and, it is more desirable for the shortened crystallization time to be less than 14 hours, or even less than 12 hours or even less than 10 hours.

It has also be determined that the shortened crystallization time can be too short to properly form a supported membrane having desired characteristics. This is believed to be due to having a lack of enough crystallization time to allow for the laydown of a sufficient layer of molecular sieve crystals. As the shortened crystallization time trends below 3 hours, the quality of the membrane layer tends to decline. Thus, the shortened crystallization time should exceed or be at least about 1 hour. It is particularly desirable for the shortened crystallization time to exceed or be at least 2 hours, and, it is more desirable for the shortened crystallization time to exceed or be at least 3 hours. An example of a suitable range for the shortened crystallization time is from at least about 1 hour to no more than about 20 hours.

The coated porous support resulting from the crystallization contacting step that utilizes the shortened crystallization time has a membrane layer with relatively few defects that tend to allow for the leakage or passage of gas. Thus, the membrane layer of the coated porous support is gas-tight due to the presence of the templating agent that remains in the pores of the molecular sieve crystals and due to the lack of membrane defects. The coated porous support, before its calcination, is therefore relatively impermeable to gases such as carbon dioxide and nitrogen. The $CO_2$ permeance (at a feed pressure of 222 kPa and permeate pressure of 84 kPa, $\Delta 86$ kPa, and a temperature of 22° C.) of the uncalcined coated porous support is typically less than $2 \times 10^{-4}$ µmol/(m²·s·Pa).

The typical thickness of the membrane layer of the coated porous support, or the final calcined, coated porous support, can be in the range of from 0.001 µm to 50 µm, but for many gas separation applications, a membrane thickness in the upper end of this range may be too thick to provide for a reasonable gas flux that allows for a desired gas separation. Therefore, generally, the membrane layer thickness should be less than 20 µm, and, even less than 10 µm. Thus, it is desirable for the membrane layer thickness to be in the range of from 0.001 µm to 50 µm, preferably, from 0.01 µm to 20 µm, and, most preferably, from 0.1 µm to 10 µm To provide a supported gas separation molecular sieve membrane ready for use, the coated porous support is calcined under conditions suitable for the removal of a substantial portion of the organic templating agent retained in the pores of the molecular sieve crystals of the membrane layer. The coated porous support may be calcined in a suitable atmosphere, including air, for an appropriate calcination time and at a calcination temperature in the range of from 250° C. to 650° C. so as to provide a calcined coated porous support. A preferred calcination temperature is in the range of from 325° C. to 625° C., and, more preferred, from 350° C. to 500° C. The calcination time may be in the range of from 0.1 hour to 100 hours, more typically from 1 hour to 75 hours, and, most typically, from 5 hours to 50 hours.

The calcined coated porous support of the invention may be used in gas separation applications, and it is particularly useful in the separation of molecules such as carbon dioxide, hydrogen sulfide and from normally gaseous hydrocarbons such as methane, ethane, propane, butane, ethylene, propylene and butylenes. As noted above, one of the advantages of the inventive method is that it provides for an economical method of manufacturing a supported gas separation membrane which method uses a single crystallization contacting step with a shortened crystallization time to prepare a gas-tight (i.e., substantially defect-free) membrane that is highly selective in the separation of certain gases of gas mixtures, such as, gas mixtures comprising carbon dioxide and methane.

The calcined coated porous support is highly selective in its permeability of $CO_2$ relative to $CH_4$ having a characteristic $CO_2/CH_4$ separation selectivity that is at least or exceeds 100. A high $CO_2/CH_4$ separation selectivity for the calcined coated porous support is preferred; since, it makes the selective separation of carbon dioxide from a gas mixture comprising methane and carbon dioxide easier; provided that, the membrane is reasonably permeable to carbon dioxide. It is, thus, desirable for the $CO_2/CH_4$ separation selectivity for the calcined coated porous support to be at least 100, preferably, at least 150, and, most preferably, at least 200. These separation selectivities are based on feed and permeate pressures, respectively, of 222 kPa and 84 kPa ($\Delta = 138$ kPa) and a temperature of 22° C.

The terms "permeance" and "selectivity" are defined in US 2007/0265484, and they are used herein in the same way. Thus, the $CO_2/CH_4$ separation selectivity characteristic of a supported gas separation molecular sieve membrane is calculated as the ratio of its – permeance of $CO_2$ to its – permeance of $CH_4$ (i.e., the $CO_2$ permeance divided by the $CH_4$ permeance). The permeance value is a pressure-normalized flux of the relevant component per unit of transmembrane pressure driving force. The flux of a component through the membrane is the number of moles of the particular component that passes through a unit of membrane surface area normal to the membrane thickness per unit of time.

Another measure of the separation performance of supported gas separation molecular sieve membranes of the invention is its separation index. The separation index of a supported gas separation molecular sieve membrane takes into account both orders of merit usually associated with membranes, permeance and selectivity, and therefore does not over emphasize one of the two factors. The separation index (SI) is defined as the $CO_2$ permeance multiplied by the quantity of (separation selectivity minus 1) multiplied by the permeate pressure. The separation index may be represented by the following formula:

$$SI=(CO_2 \text{ permeance}) \times (\text{selectivity}-1) \times (\text{permeate pressure}).$$

The calcined coated porous support of the invention should exhibit a characteristically high separation index of at least 7, preferably, at least 7.5, and, most preferably, at least 8. The separation index is based on a feed pressure of 222 kPa, a permeate pressure of 84 kPa (Δ=138 kPa) and a temperature of 22° C.

The supported gas separation molecular sieve membrane of the invention can be used in a wide variety of gas separation applications. For example, it may be used in the separation of low molecular weight alkanes from relatively higher molecular weight alkanes, or normal alkanes from isoalkanes, or low molecular weight hydrocarbons (e.g. methane, ethane, propylene, butane, ethylene, propylene, and butylenes) from inorganic or non-hydrocarbon compounds ($H_2S$, $CS_2$, $CO_2$, etc.).

A particularly useful application of the supported gas separation membrane is in the separation of $CO_2$ from a gas mixture comprising $CO_2$ and one or more hydrocarbons selected from the group consisting of $CH_4$, $C_2H_6$, $C_3H_8$, $C_4H_{10}$, $C_2H_4$, $C_3H_6$, and $C_4H_8$.

The supported gas separation membrane of the invention is considered to be especially useful in applications involving the separation of $CO_2$ from gas mixture streams comprising an exceptionally high percentage concentration of $CO_2$ in a $CH_4$ and $CO_2$ gas mixture. These gas mixture streams can have a concentration of $CO_2$ in the range upwardly to 70 or 80 volume percent. Thus, the gas mixture that can be processed using the inventive supported gas separation membrane can have a $CO_2$ concentration in the range of from 5 vol % to 80 vol %, and, more particularly, the $CO_2$ concentration of the gas mixture feed to the feed side of the supported gas separation membrane is in the range of from 20 vol % to 75 vol %, and, most particularly, from 30 to 70 vol %.

The pressure on the feed side of the supported gas separation membrane can be in the range of from atmospheric upwardly to 2000 psi. But, more typically, the feed side pressure is in the range of from 5 psi to 1500 psi, and, most typically, from 10 to 1000 psi. The pressure drop across the gas separation membrane system can, typically, be in the range of from 5 psi to 1500 psi, and, most typically, from 10 to 1000 psi.

The operating temperature on the feed side of the supported gas separation membrane can vary widely. The operating temperature can, thus, be in the range of from less than or about 0° C. to 400° C., more typically, from 10° C. to 350° C., and, most typically, from 25° C. to 300° C.

Because the supported gas separation membrane of the invention is selectively permeable to $CO_2$ over $CH_4$, the permeate stream from the supported membrane will be enriched in $CO_2$ with a relatively low concentration of $CH_4$ while the retentate stream will be depleted in $CO_2$, but it will have a high concentration of $CH_4$.

It is understood that separations made using the supported gas separation membrane can depend on a whole host of factors, such as, for example, the length and/or the total membrane surface area of an applicable assembly or system of membrane surfaces, the operating temperature and pressure conditions, including the pressure driving force across a membrane, at which the separation is conducted, the number of separate membrane surfaces connected together to perform a separation (i.e., the total membrane surface area), and other factors.

Recognizing the impact that the previously listed factors have on gas separations, it is desired to use the supported membrane or an assembly thereof to provide a permeate stream having a $CO_2$ concentration that is significantly high and exceeding 70 vol %. Preferably, the $CO_2$ concentration of the permeate stream can exceed 75 vol % and, thus, it can be in the range of from 75 vol % to or about 99 vol %. More preferably, the $CO_2$ concentration is in the range of from 80 vol % to or about 99 vol %.

It is also desirable for the retentate stream to be significantly depleted of $CO_2$, thus, the concentration of $CH_4$ therein can be in the range of from 80 vol % upwardly to or about 99.9 vol %. It is preferred for the $CH_4$ concentration of the retentate stream to be in the range of from 90 vol % to or about 99.9 vol %. It is especially desirable for the retentate stream to be pipeline-ready so that it may be discharged directly into a pipeline for transportation to end-users.

Reference is now made to FIG. 1, which presents a cross-section of a single tubular supported gas separation membrane 10 of the invention. FIG. 1 depicts a single, circular tube, but it should be understood that the supported gas separation membrane 10 can be selected from any of the suitable geometries mentioned herein, including polygonal supports, multichannel supports, monolithic supports, and hollow fiber supports. Also, the tubular supported gas separation membrane 10 may be manifolded together with a plurality of other such tubes to form an assembly (not shown) of tubes for use in gas separation.

The tubular supported gas separation membrane 10 depicted in FIG. 1 includes a tubular porous support 12 having an inside surface 14 and an outside surface 16 that together define a wall thickness 18. The inside surface 14 defines an inside diameter 22 and a tubular conduit 24 which provides a feed side of the tubular supported gas separation membrane 10 for receiving therein and passing therethrough a gas mixture.

It is noted that, in the situation when the geometry of the support structure is something other than tubular, for example, multichannel supports, monolithic supports or the like, the inside surface of the conduits of such structures relative to the outside dimensions does not take on the same significance as in the use of individual tubular support structures.

The surface areas of the inside surface 14 and the outside surface 16 can either or both be coated with a thin membrane layer of molecular sieve crystals. But, a preferred embodiment is shown in FIG. 1 with only the inside surface 14 coated with a thin, selectively permeable membrane layer 26 of molecular sieve crystals.

The tubular supported gas separation membrane 10 further has feed inlet end 28 for receiving a gaseous mixture that comprises two or more gas components such as a first gas component and a second gas component that is introduced into tubular conduit 24 by way of line 30. The tubular conduit 24 in this instance serves as the feed side of the tubular supported gas separation membrane system 10.

The gaseous mixture introduced into conduit 24 may comprise two or more gas components selected from carbon dioxide, hydrocarbons (such as, methane, ethane, propane, butane, ethylene, propylene, butylenes), non-hydrocarbons (such as, hydrogen sulfide, carbonyl sulfide, nitrogen), and other molecules that are gaseous under the conditions of use of the tubular supported gas separation membrane 10.

As the gaseous mixture passes through tubular conduit 24 a separation takes place whereby the first gas component, which is more permeable through the membrane layer 26 than the second gas component, preferentially passes through membrane layer 26 to permeate side 32 of the tubular supported gas separation membrane 10. A permeate stream is yielded and passes from the permeate side 32 by way of line 34. The permeate stream is rich in the first gas component.

The tubular supported gas separation membrane 10 also has a retentate outlet end 38 for passing a retentate stream depleted of the first gas component of the gaseous mixture from the tubular conduit 24. The retentate stream is yielded and passes from the feed side, i.e., tubular conduit 24, by way of line 40.

The application will be better understood with reference to the following examples that are provided for illustrative purposes only, and, thus, should not be considered as limiting the claims.

Example 1

This Example 1 describes, generally, the procedure used for the preparation of SAPO-34 membranes that were formed upon the inside surfaces of porous, tubular stainless steel supports having a length of either 5 cm or about 25 cm.
Preparation of Loose (Seed) Crystals Loose crystals for seeding the porous, stainless steel tube supports were made using a loose crystal solution (synthesis gel mixture) having the following composition: $1.0 Al_2O_3:1.0 P_2O_5:0.32 SiO_2:1.0$ tetraethylammonium hydroxide (TEACH):0.8 dipropylamine:0.8 cyclohexylamine:52 $H_2O$. In the synthesis of the crystals, $Al(i-C_3H_7O)_3$, $H_3PO_4$ and deionized $H_2O$ were mixed and stirred for 3 hours to form a homogeneous solution. Then, LUDOX® AS-40 colloidal 30 silica (40 wt % suspension in water, Sigma-Aldrich) was added thereto with the resulting solution being stirred for another 3 hours. Tetraethylammonium hydroxide (TEACH, 35 wt % solution in water, Sigma-Aldrich), dipropylamine (99%, Aldrich), and cyclohexylamine (99%, Sigma-Aldrich) were thereafter added, and the loose crystal solution was stirred for 4 days at 60° C. (333° K).

The loose crystal solution was then placed in an autoclave and held at 220° C. (493° K) for 24 hours. After the loose crystal solution was cooled to room temperature, it was then centrifuged at 2700 rpm for 20 minutes to separate the loose crystals, which were then washed with water. This procedure was repeated 4 times. The resultant loose crystal precipitate was dried and thereafter calcined for 5 hours at 550° C. (823° K). The calcination heating rate was 1° K/min and cooling rate was 2° K/min. The calcined, loose crystals were stored in a vacuum oven at 70° C. (343° K).
Seeding The insides of several (5 cm and 25 cm in length) porous, stainless steel tubes (0.1 grade, 0.27-μm pores, Mott Corp.) were seeded with the previously prepared calcined SAPO-34 crystals (described above). The outsides of the porous, stainless steel tubes were masked by wrapping them with TEFLON® tape. (E. I. Du Pont de Nemours and Company Corporation, Wilmington, Del.).

The seeded stainless steel tubes were then placed vertically within an autoclave. The autoclave was filled with a homogeneous synthesis gel.
The Synthesis Gel The homogeneous synthesis gel used for the secondary growth to form the membranes was a solution of $1.0 Al_2O_3: 1.0 P_2O_5:0.32 SiO_2:1.0$ TEAOH:1.6 dipropylamine:77 $H_2O$. The procedure for the preparation of this synthesis gel was similar to that used for the above-described preparation of the loose crystal solution; except, that, cyclohexylamine was not used and the aging time was 3 instead of 4 days.
Crystallization The membranes were formed by subjecting the porous stainless steel tubes that were immersed into the synthesis gel contained within an autoclave to hydrothermal crystallization conditions that included a crystallization temperature of 220° C. (493° K) for crystallization times that varied from 2 to 48 hours.

After the crystallization was completed, each membrane was washed with distilled water at 22° C. (295° K) and dried at 100° C. (373° K) in a vacuum oven for 2 hours. Each membrane was then calcined in air at 390° C. (663° K) for 10 hours to remove the templating agents from the zeolite framework. The heating rate was 0.6° K/min and cooling rate was 0.9° K/min. The permeate area was approximately 39 cm².

Example 2

This Example 2 summarizes the procedure and method for measuring and determining the performance characteristics, such as, for example, gas ($CO_2$ and $CH_4$) permeability and $CO_2/CH_4$ separation selectivity, of the membranes made by the procedure described in Example 1.

Single-gas and $CO_2/CH_4$ mixture permeations were measured by the use of an experimental flow measurement system. A membrane was mounted in a stainless steel module and sealed at each end with silicone o-rings. The pressure on each side of the membrane was independently controlled. The feed and permeate pressures were 223 kPa and 85 kPa, respectively. Fluxes were measured using a soap film bubble flow meter. The compositions of the feed, retentate, and permeate streams were measured using a HP 5890 gas chromatograph with a TCD and a HAYESEP-D column (Alltech). The oven, injector, and detector temperatures were all at 150° C. (423° K). The measured selectivities are permselectivities, which is the ratio of the permeance of each gas. The permeances were calculated as the fluxes divided by the partial pressure driving forces. Because the module had a cross-flow design, a logarithm of the mean pressure drop was used to calculate the driving force.

Example 3

This Example 3 presents the results of the quality testing of 25 cm membranes to determine the extent of defects included within the membrane layer that cause gas to leak therethrough. The 25 cm membranes were supported on a length of porous, stainless steel tube and prepared using a single hydrothermal crystallization at various crystallization synthesis time periods ranging from 2 hours to 24 hours.

A single crystallization was performed according to the procedures of Example 1 using reduced crystallization times that ranged from 2 hours to 24 hours. The resulting membranes, prior to being calcined to remove any templating agent(s) that may have been present in the zeolite pores, were tested to determine the $CO_2$ permeation rate using the procedure described in Example 2.

The results are shown in Table 1.

TABLE 1

$CO_2$ single-gas permeance at 22° C. for SAPO-34 membranes before calcination

| Crystallization time (hours) | $CO_2$ permeance $\mu mol/(m^2 \cdot s \cdot Pa)$ |
|---|---|
| 24 | 32 |
| 20 | 25 |
| 16 | 9.4 |
| 8 | $<2 \times 10^{-4}$ |
| 6 | $<2 \times 10^{-4}$ |
| 4 | $<2 \times 10^{-4}$ |
| 2 | 79 |

As may be seen from Table 1, the membranes prepared using crystallization times of 4, 6 and 8 hours, but which have not been calcined prior to the testing, had $CO_2$ single-gas permeation rates below the detection limit of $2 \times 10^{-4}$ ($\mu mol/m^2$-s-Pa). The $CO_2$ permeance increased as the crystallization time increased from or below 16 hours to 24 hours. The $CO_2$ permeance also increased as the crystallization time decreased from 2 hours, thus, presenting an unexpected desired range for the crystallization time for this system. The data presented in Table 1 suggest a desired crystallization time in the range of from 1 to 20 hours or even from 2 to 18 hours or even from 3 to 14 hours. The data further suggests that defects tend to form within the membrane layer that allow for gas leakage when lengthy crystallization time periods outside the mentioned ranges are used to make the supported membrane.

Figure 2:
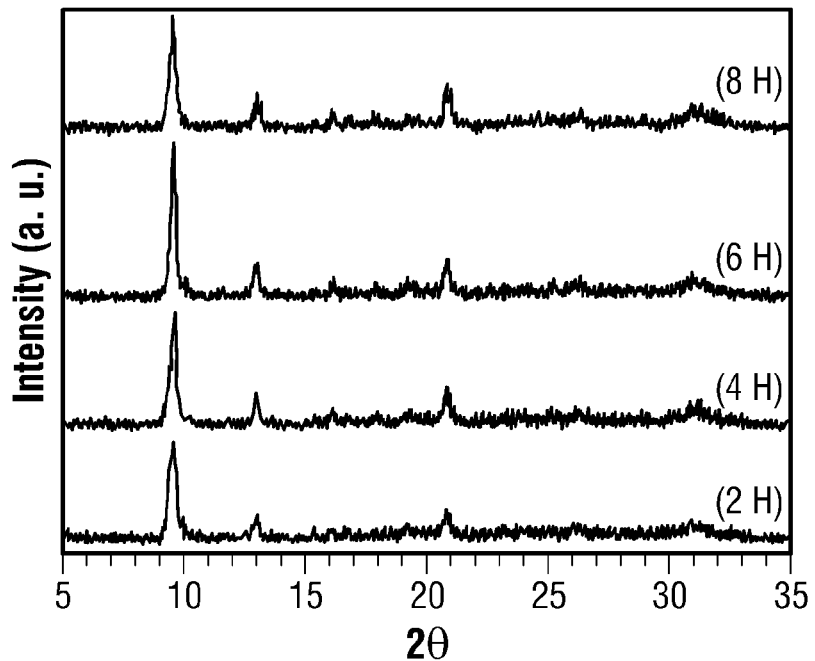
FIG. 2 presents the x-ray diffraction ("XRD") patterns for SAPO-34 crystals collected from a synthesis solution and made using a 2, 4, 6 or 8 hours crystallization time period.

In order to assess the structure of the membranes produced using the reduced crystallization times, XRD patterns of crystal powders collected during the crystallization were obtained. The XRD patterns of the crystal powders were consistent with SAPO-34. The XRD patterns of the crystals made using a 2, 4, 6 and 8 hours crystallization times are presented in FIG. 2. As may be observed, the XRD patterns are essentially identical. It is further noted that the peaks match those reported for SAPO-34 crystals. It was observed that the amount of SAPO-34 crystals at the bottom of the autoclave and in suspension increased as crystallization time increased from 2 to 8 hours. Scanning are scanning electron micrographs of crystals from each of the four crystallization time indicate that the shapes and crystal sizes of each are similar.

The membranes that were prepared using crystallization times of 4, 6, and 8 hours were calcined and used to separate a 50/50 $CO_2/CH_4$ mixture at 22° C. (295° K). The $CO_2/CH_4$ separation selectivity, $CH_4$ permeance, and $CO_2$ permeance of each membrane was determined. The resulting data are presented in the plots shown in FIG. 3.

Figure 3:
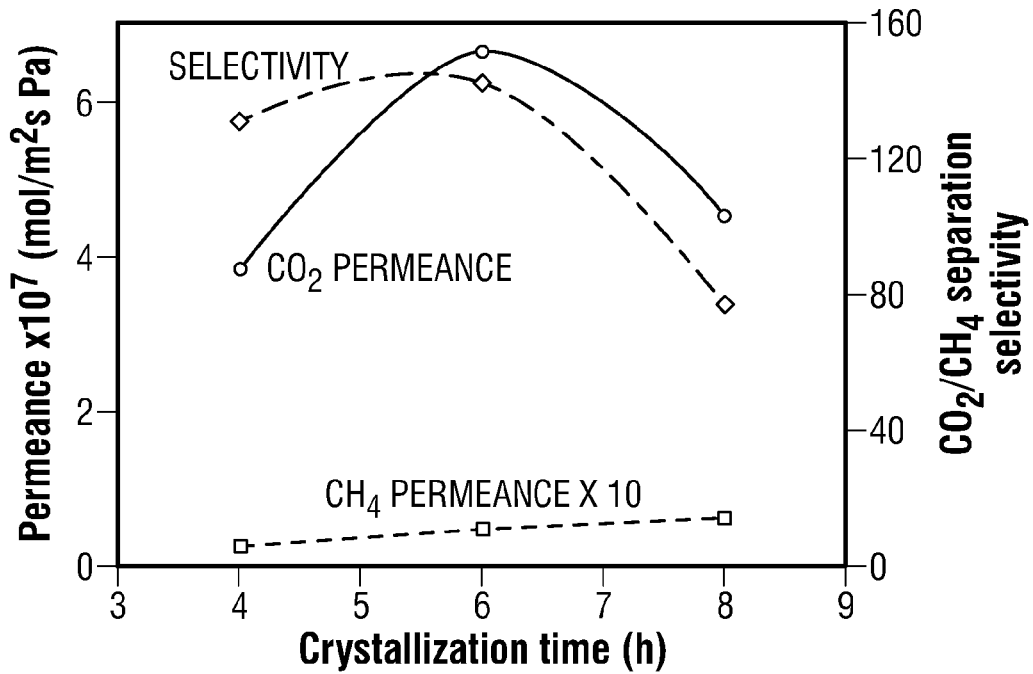
FIG. 3 includes plots of the $CO_2$ permeances, $CH_4$ permeances, and $CO_2/CH_4$ separation selectivities of the supported SAPO-34 membranes prepared using crystallization time periods of either 4, 6, or 8 hours and after calcination thereof.

As is seen in FIG. 3, the $CO_2/CH_4$ separation selectivity was greater than 77 for each of the single crystallization 25 cm in length membranes with a maximum value for the $CO_2/CH_4$ separation selectivity of 142 for the membrane made using a crystallization time of 6 hours. This membrane also exhibited among the three membranes the largest $CO_2$ permeance, which was $6.6 \times 10^{-7}$ mol/$(m^2 \cdot s \cdot Pa)$.

Example 4

This Example 4 presents the results of the performance testing of calcined, 25 cm in length membranes that were prepared using synthesis times of either 6 hours or 48 hours.

Table 2 shows the separation properties of the membranes prepared with crystallization times of 6 and 48 hours. In addition to presenting the $CO_2$ permeance and $CO_2/CH_4$ selectivity, the separation index is presented to provide for a comparison of the separation performance of each of the membranes. The separation index (SI) is calculated as:

$$SI = (CO_2 \text{ permeance}) \times (\text{selectivity} - 1) \times (\text{permeate pressure})$$

TABLE 2

Separation properties (using 50/50 $CO_2/CH_4$ feed at 22° C.) of SAPO-34 membranes prepared using 48-hour and 6-hour synthesis times

| Membrane | $CO_2$ Permeance × $10^7$ mol/$(m^2 \cdot s \cdot Pa)$ | $CO_2/CH_4$ Separation Selectivity | Separation Index mol/$m^2 \cdot s$ |
|---|---|---|---|
| M1 - 6 hrs | 6.3 | 145 | 7.6 |
| M2 - 6 hrs | 10.4 | 130 | 11.3 |
| M3 - 6 hrs | 7 | 111 | 6.5 |
| X1 - 48 hrs | 2.5 | 82 | 1.7 |
| X2 - 48 hrs | 2 | 74 | 1.2 |
| X3 - 48 hrs | 2.3 | 90 | 1.7 |

As may be observed from the comparative data that is presented in Table 2, the membranes prepared using a shortened crystallization time of only 6 hours exhibited performance characteristics that were significantly better than those of the membranes that were prepared using the longer, 48-hour crystallization time. Not only is the separation index of the membranes prepared with a 6-hour crystallization time much improved over that of the membranes prepared with a 48-hour crystallization time, but the $CO_2$ permeance and $CO_2/CH_4$ separation selectivity are significantly better as well. This improvement in membrane performance is an unexpected result of the use of a shortened crystallization time in the preparation of the gas separation membrane.

Example 5

This Example 5 presents the results from the performance testing of calcined, 5 cm in length membranes that were prepared using a synthesis time of 24 hours.

Table 3 shows the separation properties of the membranes prepared with a 24-hour crystallization time.

TABLE 3

Separation properties (using 50/50 $CO_2/CH_4$ feed at 22° C.) of SAPO-34 membranes prepared using 24-hour synthesis time

| Membrane | $CO_2$ Permeance mol/$(m^2 \cdot s \cdot Pa)$ | $CO_2/CH_4$ Separation Selectivity | Separation Index mol/$m^2 \cdot s$ |
|---|---|---|---|
| Y1 - 24 hrs | 5.9 | 133 | 6.5 |
| Y2 - 24 hrs | 4.4 | 145 | 5.3 |
| Y3 - 24 hrs | 3.8 | 170 | 5.4 |
| Y4 - 24 hrs | 4.3 | 154 | 5.5 |

While a comparison of the performance of the 5 cm membranes against the performance of the 25 cm membranes may not be completely appropriate due to the significant size differences in the membranes and the possible impact that manufacturing system geometry may have on the formation of the membrane layers on a porous support, it is noted that the separation index of the 25 cm membranes of Example 4, prepared using a shortened 6-hour crystallization time, is better than the separation index of the 5 cm membranes that were prepared using a 24-hour crystallization time. Thus, the data presented in Example 4 and in this Example 5 indicate that, as the crystallization time is shorted from 48 hours to 24 hours and then to 6 hours, the performance characteristics of the membrane unexpectedly improves.

Various changes and modifications may be made to the aforedescribed embodiments of the invention without departing from the spirit of the invention. Such obvious variations and modifications are considered to be within the proper scope of this invention.

What is claimed is:

1. A method of making a supported gas separation molecular sieve membrane, wherein said method comprises:
    applying molecular sieve crystals to a surface of a porous support to thereby provide a seeded porous support surface;
    contacting under hydrothermal synthesis conditions said seeded porous support surface with a synthesis gel mixture for a shortened crystallization time in the range of less than 15 hours so as to provide a coated porous support, wherein said synthesis gel comprises:
        an aluminum source, a phosphorus source, a silicon source, a quaternary ammonium templating agent (R), and water in amounts such that the composition of said synthesis gel has the following molar ratios:

$1Al_2O_3:aP_2O_5:bSiO_2:cR:dH_2O;$ wherein:
    a is from 0.01 to 52;
    b is from 0.03 to 196;
    c is from 0.2 to 5; and
    d is from 20 to 300; and
    calcining said coated porous support under calcination conditions including a calcination temperature in the range of from 250° C. to 650° C. to thereby provide said supported gas separation molecular sieve membrane that is characterized as having a $CO_2/CH_4$ separation selectivity (based on a pressure driving force of 138 kPa and a temperature of 22° C.) of at least 100.

2. A method as recited in claim 1, wherein said shortened crystallization time exceeding about 1 hour and said hydrothermal synthesis conditions include a hydrothermal synthesis temperature in the range of from 50° C. to 300° C. with the hydrothermal synthesis being conducted at autogenous pressure.

3. A method as recited in claim 1, wherein said coated porous support includes a membrane layer having a membrane thickness in the range of from 0.001 μm to 50 μm and comprising SAPO-34 molecular sieve crystals.

4. A method as recited in claim 1, wherein said porous support includes a porous material selected from a group consisting of inorganic porous materials, a stainless steel, a molybdenum alloy, and an austenitic nickel-chromium-based alloy.

5. A method as recited in claim 1, wherein said supported gas separation molecular sieve membrane is further characterized as having a separation index (based on a pressure driving force of 138 kPa and a temperature of 22° C.) of at least 7.

6. A method as recited in claim 1, wherein said $CO_2/CH_4$ separation selectivity is at least 110.

7. A method as recited in claim 1, wherein said shortened crystallization time exceeds 2 hours.

8. A method as recited in claim 1, wherein said shortened crystallization time exceeds 3 hours but is less than 14 hours.

9. A supported gas separation molecular sieve membrane made by the method of claim 1.

10. A process for separating a first gas component from a gas mixture comprising said first gas component and a second gas component, wherein said process comprises:
    providing a gas separation molecular sieve membrane according to the method of claim 1, said gas separation molecular sieve membrane comprising a feed side with a feed inlet and a retentate outlet and a permeate side, wherein said gas separation molecular sieve membrane is selectively permeable to said first gas component over said second gas component;
    introducing said gas mixture to said feed inlet of said gas separation molecular sieve membrane; and
    yielding a permeate stream from said permeate side of said gas separation molecular sieve membrane and a retentate stream from said retentate outlet, wherein said retentate stream is depleted of said first gas component and said permeate stream is rich in said first gas component.

11. A process as recited in claim 10, wherein said coated porous support includes a membrane layer having a membrane thickness in the range of from 0.001 to 50 μm and comprising SAPO-34 molecular sieve crystals.

12. A process as recited in claim 10, wherein said gas separation molecular sieve membrane comprises a porous support and said porous support includes a porous material selected from a group consisting of inorganic porous materials, a stainless steel, a molybdenum alloy and an austenitic nickel-chromium-based alloy.

13. A process as recited in claim 10, wherein said supported gas separation molecular sieve membrane is further characterized as having a separation index (based on a pressure driving force of 138 kPa and a temperature of 22° C.) of at least 7.

14. A process as recited in claim 10, wherein said $CO_2/CH_4$ separation selectivity is at least 110.

15. A process for separating a first gas component from a gas mixture comprising said first gas component and a second gas component, wherein said process comprises:
    providing a gas separation molecular sieve membrane system comprising a porous support coated with a membrane layer of silicoaluminophosphate 34 molecular sieve crystals and a thickness in the range of from 0.001 μm to 50 μm crystallized for a time in a range of less than 15 hours, the system having a feed side with a feed inlet and a retentate outlet and a permeate side, wherein said gas separation molecular sieve membrane system is selectively permeable to said first gas component over said second gas component;
    introducing said gas mixture to said feed inlet of said gas separation molecular sieve membrane system; and
    yielding a permeate stream from said permeate side of said gas separation molecular sieve membrane system and a retentate stream from said retentate outlet, wherein said retentate stream is depleted of said first gas component and said permeate stream is rich in said first gas component.

16. A process as recited in claim 15, wherein the membrane layer has a thickness less than 20 μm.

17. A process as recited in claim 15, wherein said porous support includes a porous material selected from a group consisting of inorganic porous materials, a stainless steel, a molybdenum alloy, and an austenitic nickel-chromium-based alloy.

18. A process as recited in claim 15, wherein said supported gas separation molecular sieve membrane is further characterized as having a separation index (based on a pressure driving force of 138 kPa and a temperature of 22° C.) of at least 7.

19. A process as recited in claim 15, wherein said $CO_2/CH_4$ separation selectivity is at least 110.

20. A method as recited in claim 1, wherein contacting said seeded porous support surface with a synthesis gel comprises contacting said seeded porous support surface with a synthesis gel mixture for a single crystallization time.

21. A process as recited in claim 15, wherein the silicoaluminophosphate 34 molecular sieve crystals are crystallized in a single crystallization step.

22. A method as recited in claim 1, wherein said porous support comprises a porous material selected from a group consisting of alumina, titania and zirconia.

23. A process as recited in claim 10, wherein said gas separation molecular sieve membrane comprises a porous support and said porous support comprises a porous material selected from a group consisting of alumina, titania and zirconia.

24. A process as recited in claim 15, wherein said porous support comprises a porous material selected from a group consisting of alumina, titania and zirconia.

\* \* \* \* \*

UNITED STATES PATENT AND TRADEMARK OFFICE
CERTIFICATE OF CORRECTION

| | | |
|---|---|---|
| PATENT NO. | : 8,685,143 B2 | Page 1 of 1 |
| APPLICATION NO. | : 12/936795 | |
| DATED | : April 1, 2014 | |
| INVENTOR(S) | : Moises Abraham Carreon et al. | |

It is certified that error appears in the above-identified patent and that said Letters Patent is hereby corrected as shown below:

> On the Title Page, in Item [75] under Inventors, at line 3, please delete "Boulder, TX" and insert --Boulder, CO--.

Signed and Sealed this
Twenty-fourth Day of June, 2014

Michelle K. Lee
*Deputy Director of the United States Patent and Trademark Office*